US008714324B2

(12) United States Patent
Shimoda et al.

(10) Patent No.: US 8,714,324 B2
(45) Date of Patent: May 6, 2014

(54) DYNAMIC VIBRATION ABSORBER AND DYNAMIC VIBRATION ABSORBING APPARATUS USING THE SAME

(75) Inventors: Ikuo Shimoda, Tokyo (JP); Yukito Matsumoto, Ashikaga (JP); Osamu Hasegawa, Tokyo (JP)

(73) Assignee: Oiles Corporation, Tokyo (JP)

( * ) Notice: Subject to any disclaimer, the term of this patent is extended or adjusted under 35 U.S.C. 154(b) by 178 days.

(21) Appl. No.: 10/563,446

(22) PCT Filed: Apr. 20, 2004

(86) PCT No.: PCT/JP2004/005594
§ 371 (c)(1),
(2), (4) Date: Jan. 4, 2006

(87) PCT Pub. No.: WO2005/005857
PCT Pub. Date: Jan. 20, 2005

(65) Prior Publication Data
US 2007/0051576 A1 Mar. 8, 2007

(30) Foreign Application Priority Data

Jul. 11, 2003 (JP) .................................. 2003-273759

(51) Int. Cl.
*F16F 7/10* (2006.01)
*F16F 1/18* (2006.01)

(52) U.S. Cl.
USPC ............................ 188/379; 188/380; 267/136

(58) Field of Classification Search
USPC ............... 188/378, 379, 380, 322.5; 267/136, 267/158, 160, 151, 259, 140.14, 140.15; 248/636, 638
See application file for complete search history.

(56) References Cited

U.S. PATENT DOCUMENTS

| 989,958 A | * | 4/1911 | Frahm .......................... 188/380 |
| 4,705,982 A | * | 11/1987 | Besson et al. ................. 310/356 |
| 5,052,529 A | * | 10/1991 | Sutcliffe et al. ............... 188/378 |
| 5,445,249 A | * | 8/1995 | Aida et al. ..................... 188/378 |
| 5,595,430 A | * | 1/1997 | Weyeneth ................. 312/319.1 |
| 6,286,782 B1 | * | 9/2001 | Bansemir et al. .......... 244/17.11 |
| 7,189,053 B2 | * | 3/2007 | Winkler et al. ............... 415/108 |

(Continued)

FOREIGN PATENT DOCUMENTS

| JP | 55-103131 A | | 8/1980 |
| JP | 6098589 A | * | 6/1985 |
| JP | 08-159203 A | | 6/1996 |
| JP | 11166582 A | * | 6/1999 |
| JP | 2000-346129 A | | 12/2000 |
| WO | 95/28577 A1 | | 10/1995 |

OTHER PUBLICATIONS

International Search Report of PCT/JP2004/005594, mailed Jun. 22, 2004.

(Continued)

*Primary Examiner* — Melody Burch
(74) *Attorney, Agent, or Firm* — Nixon & Vanderhye, P.C.

(57) ABSTRACT

A dynamic vibration absorber (1) includes: a weight (2); a frame body (3) which surrounds the weight (2); a total of four pairs of vertically mounted U-shaped leaf springs (4, 5, 6 and 7) which are interposed between the frame body (3) and the weight (2) so as to hold the weight (2) with respect to the frame body (3) movably with respect to all directions in a horizontal plane and immovably in a vertical direction (V); and a damping mechanism 8 for damping the vibration of the weight (2) in the horizontal plane.

10 Claims, 4 Drawing Sheets

(56) References Cited

U.S. PATENT DOCUMENTS

| | | | |
|---|---|---|---|
| 7,312,991 B2* | 12/2007 | Lee et al. | 361/695 |
| 7,478,803 B2* | 1/2009 | Lee | 267/293 |
| 2004/0134733 A1* | 7/2004 | Wood | 188/379 |
| 2006/0017208 A1* | 1/2006 | Bechtold et al. | 267/165 |

OTHER PUBLICATIONS

CD-ROM of the specification and drawings annexed to the request of Japanese Utility Model Application No. 99714/1991 (Laid-open No. 42789/1993), Jun. 11, 1993.

* cited by examiner

DYNAMIC VIBRATION ABSORBER AND DYNAMIC VIBRATION ABSORBING APPARATUS USING THE SAME

This application is the US national phase of international application PCT/JP2004/005594, filed 20 Apr. 2004, which designated the U.S. and claims priority of JP 2003-273759, filed 11 Jul. 2003, the entire contents of each of which are hereby incorporated by reference.

TECHNICAL FIELD

The present invention relates to a dynamic vibration absorber for reducing vibrations caused in a structure due to a strong wind, an earthquake, and the like, and a dynamic vibration absorbing apparatus using a plurality of the dynamic vibration absorbers.

BACKGROUND ART

As a dynamic vibration absorber, one disclosed in JP-A-9-119477 is known, and this dynamic vibration absorber is so constructed that a plurality of leaf spring members are extended from a common supporting member, and weights are respectively attached to distal ends of these leaf spring members and are swingably supported in a cantilevered manner, damping members being respectively attached to damp the swinging motion of these weights.

DISCLOSURE OF THE INVENTION

Incidentally, in such a dynamic vibration absorber, if a weight of a large mass is used to allow the weight to be tuned to a low natural frequency so as to swingably support the weight in a cantilevered manner by the leaf spring member, the leaf spring member is deflected from the outset, and a large space is required with respect to the structure to allow the weight to undergo a predetermined swinging motion, making it difficult to install the dynamic vibration absorber compactly in the structure. Meanwhile, in a case where a leaf spring member having a large elastic constant is used to reduce the deflection, even if a weight of a large mass is used, it becomes difficult to tune to a low natural frequency.

In addition, in the above-described dynamic vibration absorber, since the swinging direction of the leaf spring member is perpendicular to the plane of installation of the dynamic vibration absorber with respect to the structure, the above-described dynamic vibration absorber is by and large able to exhibit an effect with respect to vibrations in the vertical direction of the structure, but is not suitable to the damping of the vibrations in the horizontal direction of the structure due to an earthquake, a strong wind, and the like.

The present invention has been devised in view of the above-described aspects, and its object is to provide a dynamic vibration absorber which can be installed compactly even if the mass of the weight is made large, since there is no need to especially provide a large space with respect to a structure for allowing the weight to undergo predetermined swinging motion, which can be easily tuned to a low natural frequency even if the weight having a large mass is used, since there is no need to correspondingly use leaf spring members having large elastic constants, and which can be suitably used for damping the vibration of the structure in the horizontal direction due to an earthquake, a strong wind, and the like, as well as a dynamic vibration absorbing apparatus using a plurality of these dynamic vibration absorbers.

A dynamic vibration absorber in accordance with a first aspect of the invention comprises: a weight; a frame body which surrounds the weight; a plurality of vertically mounted U-shaped leaf springs which are interposed between the frame body and the weight so as to hold the weight with respect to the frame body movably with respect to all directions in a plane and immovably in a vertical direction perpendicular to the plane; and a damping mechanism for damping the vibration of the weight in the plane.

According to the dynamic vibration absorber in accordance with the first aspect, since the U-shaped leaf springs are vertically mounted, are interposed between the weight and the frame body, and are adapted to hold the weight with respect to the frame body movably in all directions in the plane and immovably in the vertical direction perpendicular to the plane, even if the weight having a large mass is used, the leaf springs are practically not deflected in the vertical direction. Therefore, even if the mass of the weight is made large, the dynamic vibration absorber can be installed compactly since there is no need to especially provide a large space with respect to the structure for allowing the weight to undergo predetermined swinging motion. Moreover, even if the weight having a large mass is used, the dynamic vibration absorber can be easily tuned to a low natural frequency since there is no need to correspondingly use the leaf spring members having large elastic constants. In addition, the dynamic vibration absorber can be suitably used for damping the vibration of the structure in the horizontal direction due to an earthquake, a strong wind, and the like, by installing the dynamic vibration absorber in which the plane is set to the horizontal plane.

In the invention, as in the dynamic vibration absorber in accordance with a second aspect thereof, the weight in a plan view is preferably formed substantially in the shape of a regular polygon including a regular triangle, for example, a square, a regular pentagon or a regular hexagon and, in a more preferable example, a square or a regular hexagon. However, in a case where the U-shaped leaf springs can be interposed, as desired, between the vertical wall portion and the weight, the weight may be formed by a cylindrical body. Furthermore, the weight may be formed substantially in the shape of a rectangle, a circle, an ellipse, or the like in a plan view, or may be formed in an asymmetrical shape with respect to a vertical axis.

In the invention, as in the dynamic vibration absorber in accordance with a third aspect thereof, the frame body in a plan view is preferably formed substantially in the shape of a regular polygon including a regular triangle, for example, a square, a regular pentagon or a regular hexagon and, in a more preferable example, a square or a regular hexagon. However, in a case where the U-shaped leaf springs can be interposed, as desired, between the vertical wall portion and the weight, the frame body may be formed by a hollow cylindrical body. Furthermore, the frame body may be formed substantially in the shape of a rectangle, a circle, an ellipse, or the like in a plan view, or may be formed in an asymmetrical shape with respect to the vertical axis.

In the dynamic vibration absorber in accordance with a fourth aspect of the invention, the frame body has a pair of X-direction vertical wall portions opposed to each other in an X direction in the plane with the weight disposed therebetween and a pair of Y-direction vertical wall portions opposed to each other in a Y direction which intersects the X direction in the plane with the weight disposed therebetween, and at least one of the leaf springs is interposed between each of the pair of X-direction vertical wall portions and the weight, such that one edge portion thereof extending in the vertical direction is secured to the X-direction vertical wall portion, and that another edge portion thereof extending in the vertical direction is secured to the weight respectively, while at least another one of the leaf springs is interposed between each of the pair of Y-direction vertical wall portions and the weight, such that one edge portion thereof extending in the vertical direction is secured to the Y-direction vertical wall portion, and that another edge portion thereof extending in the vertical direction is secured to the weight respectively.

In a preferred example of the invention, each of the leaf springs has a U-shaped portion which is curved between the one edge portion extending in the vertical direction and the other edge portion extending similarly in the vertical direction, and holds the weight movably with respect to all directions in the plane with respect to the frame body by means of the U-shaped portion.

One leaf spring may be interposed between each of the pair of X-direction vertical wall portions and the weight and between each of the pair of Y-direction vertical wall portions and the weight. Preferably, however, as in the dynamic vibration absorber in accordance with a fifth aspect of the invention, a plurality of leaf springs arranged in parallel are interposed therebetween, each of the leaf springs being secured at the one edge portion thereof to the vertical wall portion and at the other edge portion thereof to the weight, respectively.

In the invention, the Y direction is sufficient if it intersects the X direction. Preferably, however, as in the dynamic vibration absorber in accordance with a sixth aspect of the invention, the Y direction is perpendicular to the X direction.

The damping mechanism may be a mechanism which employs the shear resistance of a viscous body, and as in the dynamic vibration absorber in accordance with a seventh aspect of the invention, the damping mechanism may include a magnetic field generating body which is fixed to one of the weight and the frame body and generates a magnetic field and a plate-like electric conductor which is fixed to another one of the weight and the frame body and generates an eddy current by its relative movement with respect to the magnetic field generating body. Here, as in the dynamic vibration absorber in accordance with an eighth aspect of the invention, the magnetic field generating body may have a permanent magnet which generates a pair of magnetic poles of mutually different polarities which oppose each other with a gap therebetween so as to generate a magnetic field at a central portion of the electric conductor.

The dynamic vibration absorber in accordance with the invention is installed in a structure whose vibrations are subject to damping. In a case where one dynamic vibration absorber is installed in such a structure, the dynamic vibration absorber is preferably tuned to a natural frequency of a structure where the dynamic vibration absorber is installed, as in the dynamic vibration absorber in accordance with a ninth aspect of the invention.

A dynamic vibration absorbing apparatus in accordance with a first aspect of the invention comprises a plurality of dynamic vibration absorbers in accordance with any one of the above-described first to ninth aspects, wherein a natural frequency for the weight of at least one of the dynamic vibration absorbers is different from a natural frequency for the weight of another one of the dynamic vibration absorbers.

According to the dynamic vibration absorbing apparatus in accordance with the first aspect, since the dynamic vibration absorbing apparatus has mutually different natural frequencies for the weights, by making the different natural frequencies close to each other, it becomes possible to cope with a change in the natural frequency of the structure where the dynamic vibration absorbing apparatus is installed, and it becomes possible to damp the vibration of the structure satisfactorily irrespective of the change in the natural frequency of the structure. In addition, by adjusting the different natural frequencies to various order modes of the natural frequencies of the structure where the dynamic vibration absorbing apparatus is installed, it becomes possible to cope with the various order modes of the natural frequencies of the structure where the apparatus is installed, thereby making it possible to effectively damp the vibration modes of the various orders.

In the dynamic vibration absorbing apparatus in accordance with the invention, as in a second aspect thereof, the mass of the weight of the at least one of the dynamic vibration absorbers may be different from the mass of the weight of the other one of the dynamic vibration absorbers; as in a third aspect thereof, a spring constant of the at least one of the dynamic vibration absorbers may be different from a spring constant of the other one of the dynamic vibration absorbers; and as in a fourth aspect thereof, a damping coefficient of the at least one of the dynamic vibration absorbers may be different from a damping coefficient of the other one of the dynamic vibration absorbers.

According to the invention, it is possible to provide a dynamic vibration absorber which can be installed compactly even if the mass of the weight is made large, since there is no need to especially provide a large space with respect to a structure for allowing the weight to undergo predetermined swinging motion, which can be easily tuned to a low natural frequency even if the weight having a large mass is used, since there is no need to correspondingly use leaf spring members having large elastic constants, and which can be suitably used for damping the vibration of the structure in the horizontal direction due to an earthquake, a strong wind, and the like, as well as a dynamic vibration absorbing apparatus using a plurality of these dynamic vibration absorbers.

Hereafter, referring to the drawings, a more detailed description will be given of the present invention and the embodiments in which the mode for carrying out the invention is used in a structure. It should be noted that the present invention is not limited to these embodiments.

BEST MODE FOR CARRYING OUT THE INVENTION

Figure 1:
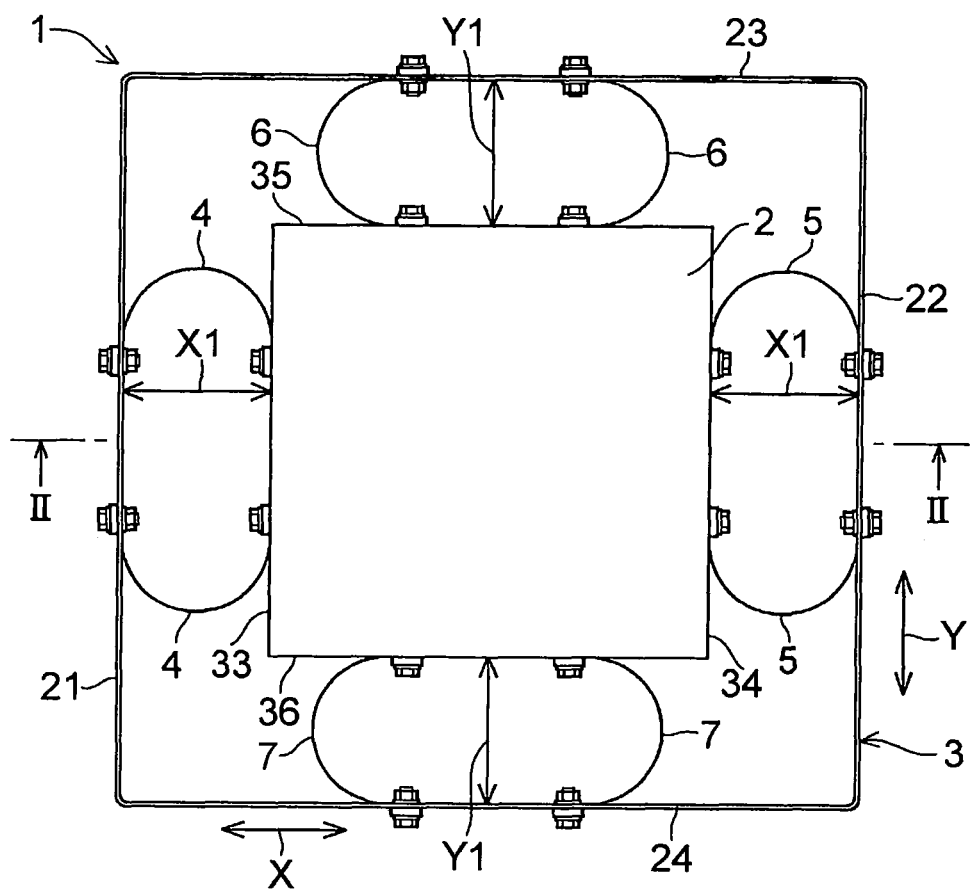
FIG. 1 is a plan view of a preferred embodiment of the invention.
Figure 2:
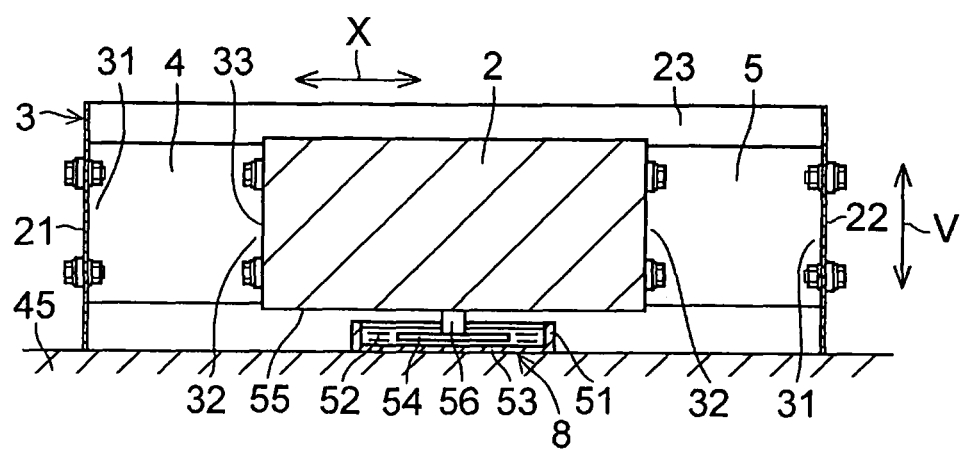
FIG. 2 is a cross-sectional view, taken in the direction of arrows along line II-II, of the embodiment shown in FIG. 1.
Figure 3:
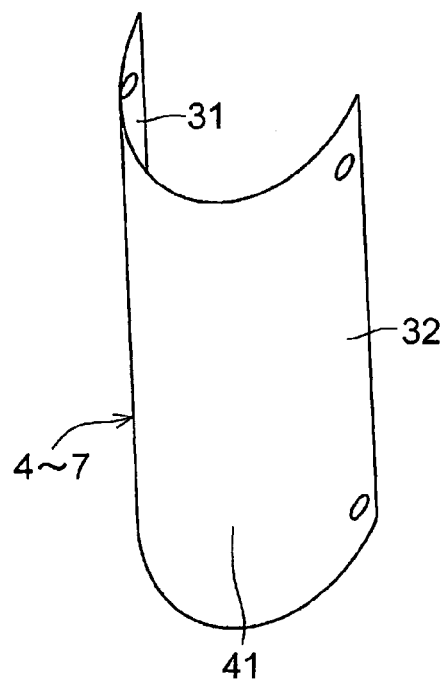
FIG. 3 is a perspective view of a leaf spring of the embodiment shown in FIG. 1.

In FIGS. 1 to 3, a dynamic vibration absorber 1 in accordance with this embodiment is comprised of a weight 2 which is substantially square in a plan view and is constituted by a rectangular parallelepiped; a frame body 3 which surrounds the weight 2 and is substantially square in a plan view; a plurality of, i.e., in this embodiment a total of four pairs of, vertically mounted U-shaped leaf springs 4, 5, 6 and 7 which are interposed between the frame body 3 and the weight 2 so as to hold the weight 2 with respect to the frame body 3 movably in a plane, i.e., with respect to all directions in a horizontal plane in this embodiment, and immovably in a vertical direction perpendicular to the horizontal plane, i.e., in a vertical direction V in this embodiment; and a damping mechanism 8 for damping the vibration of the weight 2 in the horizontal plane.

The frame body 3 which is fixed to a floor portion 45 such as a roof floor or the like of a structure has a pair of X-direction vertical wall portions 21 and 22 which are opposed to each other in an X direction in the horizontal plane with the weight 2 disposed therebetween and with a clearance X1 with respect to the weight 2, as well as a pair of Y-direction vertical wall portions 23 and 24 which are opposed to each other in a Y direction which intersects, i.e., in this embodiment is perpendicular to, the X direction in the horizontal plane with the weight 2 disposed therebetween and with a clearance Y1 with respect to the weight 2. The pair of X-direction vertical wall portions 21 and 22 and the pair of Y-direction vertical wall portions 23 and 24 are integrally connected to each other so as to form the frame body 3 which is square in a plan view.

At least one, i.e., in this embodiment a total of two pairs of, the leaf springs 4 and 5 are respectively interposed between each of the pair of X-direction vertical wall portions 21 and 22 and each of side surfaces 33 and 34 of the weight 2, such that one edge portions 31 thereof extending in the vertical direction V are respectively secured to the X-direction vertical wall portions 21 and 22, and other edge portions 32 thereof extending in the vertical direction V are respectively secured to the side surfaces 33 and 34 of the weight 2. Meanwhile, at least one, i.e., in this embodiment a total of two pairs of, the leaf springs 6 and 7 are respectively interposed between each of the pair of Y-direction vertical wall portions 23 and 24 and each of side surfaces 35 and 36 of the weight 2, such that one edge portions 32 thereof extending in the vertical direction V are respectively secured to the Y-direction vertical wall portions 23 and 24, and other edge portions 32 thereof extending in the vertical direction V are respectively secured to the side surfaces 35 and 36 of the weight 2.

A plurality of, i.e., in this embodiment a pair of, leaf springs 4 which are arranged in parallel are interposed between the X-direction vertical wall portion 21 and the side surface 33 of the weight 2. A plurality of, i.e., in this embodiment a pair of, leaf springs 5 which are arranged in parallel are interposed between the X-direction vertical wall portion 22 and the side surface 34 of the weight 2. A plurality of, i.e., in this embodiment a pair of, leaf springs 6 which are arranged in parallel are interposed between the Y-direction vertical wall portion 23 and the side surface 35 of the weight 2. A plurality of, i.e., in this embodiment a pair of, leaf springs 7 which are arranged in parallel are interposed between the Y-direction vertical wall portion 24 and the side surface 36 of the weight 2. The respective leaf springs 4 having their concave surfaces opposed to each other are secured to the X-direction vertical wall portion 21 at their one edge portions 31 and to the side surface 33 of the weight 2 at their other edge portions 32. The respective leaf springs 5 having their concave surfaces opposed to each other are secured to the X-direction vertical wall portion 22 at their one edge portions 31 and to the side surface 34 of the weight 2 at their other edge portions 32. The respective leaf springs 6 having their concave surfaces opposed to each other are secured to the Y-direction vertical wall portion 23 at their one edge portions 31 and to the side surface 35 of the weight 2 at their other edge portions 32. The respective leaf springs 7 having their concave surfaces opposed to each other are secured to the Y-direction vertical wall portion 24 at their one edge portions 31 and to the side surface 36 of the weight 2 at their other edge portions 32.

Each of the leaf springs 4, 5, 6 and 7 has a U-shaped portion 41 which is curved between the edge portion 31 and the edge portion 32, in addition to the one edge portion 31 extending in the vertical direction V and the other edge portion 32 extending in the vertical direction, and holds the weight 2 movably with respect to all directions in the horizontal plane with respect to the frame body 3 by means of the U-shaped portion 41.

The damping mechanism 8 includes a container 51 fixed to the floor portion 45 such as the roof floor or the like of the structure; a viscous body 52 accommodated in the container 51; a resistance plate 54 disposed in the viscous body 52 in such a manner as to oppose a bottom plate 53 of the container 51 with a very small gap therebetween; and a mounting member 56 for mounting the resistance plate 54 to a bottom surface 55 of the weight 2. As the weight 2 is relatively moved in the horizontal plane with respect to the floor portion 45, the damping mechanism 8 is adapted to cause shear deformation in the viscous body 52 between the bottom plate 53 and the resistance plate 54, thereby damping the relative movement of the weight 2 in the horizontal plane with respect to the floor portion 45 by the shear resistance due to this shear deformation.

The above-described dynamic vibration absorber 1 is installed in the structure as the frame body 3 at its lower edges is secured to the floor portion 45. In this installation, the natural frequency of the weight 2 is tuned to the natural frequency of the structure. In such a dynamic vibration absorber 1, when the structure does not vibrate in the horizontal plane, the weight 2 is held by the leaf springs 4, 5, 6 and 7 movably in all directions in the horizontal plane and immovably in the vertical direction V, respectively.

Further, with the dynamic vibration absorber 1, if the floor portion 45 of the structure vibrates in the X direction and the Y direction due to an earthquake, a strong wind, and the like, and the weight 2 vibrates in the X direction and Y direction relative to the floor portion 45 by being tuned to this vibration, this vibration causes shear deformation in the viscous body 52 between the bottom plate 53 and the resistance plate 54. The relative movement of the weight 2 in the horizontal plane with respect to the floor portion 45 is damped by the shear resistance due to this shear deformation, so that the vibration of the structure in the X direction and the Y direction is damped by such absorption of the vibrational energy by the damping mechanism 8.

Incidentally, according to the dynamic vibration absorber 1, since the U-shaped leaf springs 4, 5, 6 and 7 are vertically mounted, are interposed between the weight 2 and the frame body 3, and are adapted to hold the weight 2 with respect to the frame body 3 movably in all directions in the horizontal plane and immovably in the vertical direction V perpendicular to the horizontal plane, even if the weight 2 having a large mass is used, the leaf springs 4, 5, 6, and 7 are practically not deflected in the vertical direction V. Therefore, even if the mass of the weight 2 is made large, the dynamic vibration absorber 1 can be installed compactly since there is no need to especially provide a large space with respect to the structure for allowing the weight 2 to undergo predetermined swinging motion. Moreover, even if the weight having a large mass is used, the dynamic vibration absorber 1 can be easily tuned to a low natural frequency since there is no need to correspondingly use the leaf springs 4, 5, 6 and 7 having large elastic constants. In addition, the dynamic vibration absorber 1 can be suitably used for damping the vibration of the structure in the horizontal direction due to an earthquake, a strong wind, and the like, since the dynamic vibration absorber 1 is installed as the plane in which the weight 2 becomes movable with respect to the frame body 3 is set to the horizontal plane as in this embodiment.

Figure 4:
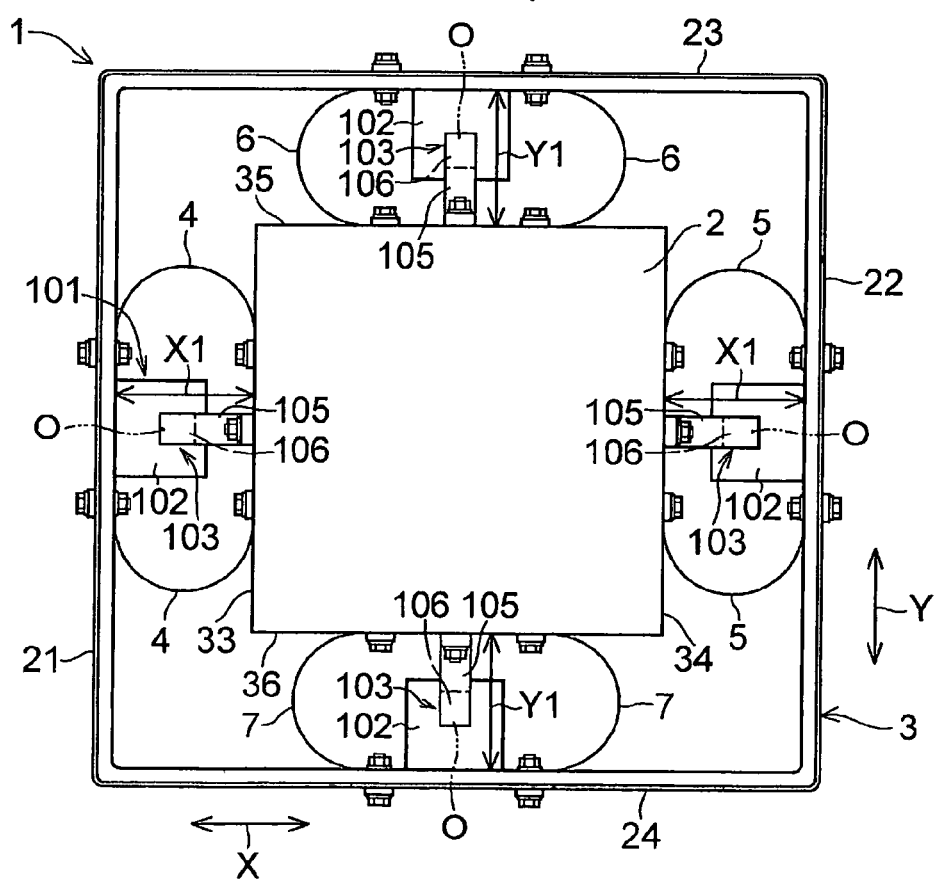
FIG. 4 is a plan view of another preferred embodiment of the invention.
Figure 5:
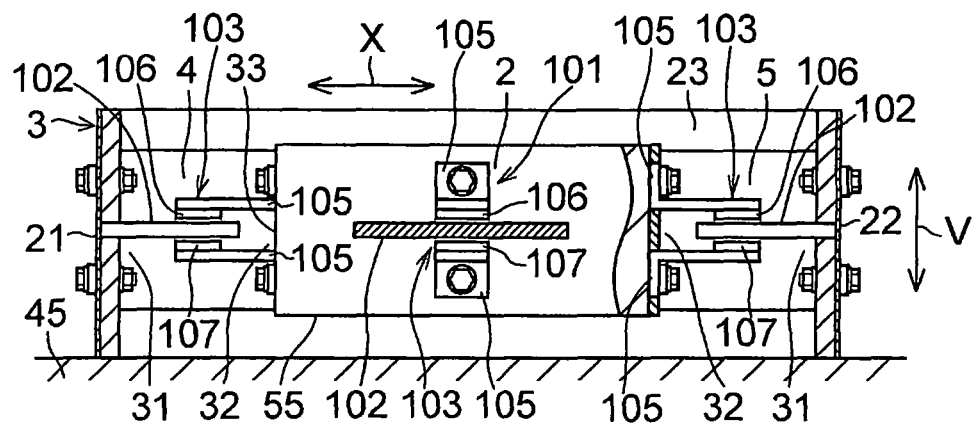
FIG. 5 is an explanatory side cross-sectional view of the embodiment shown in FIG. 4.
Figure 6:
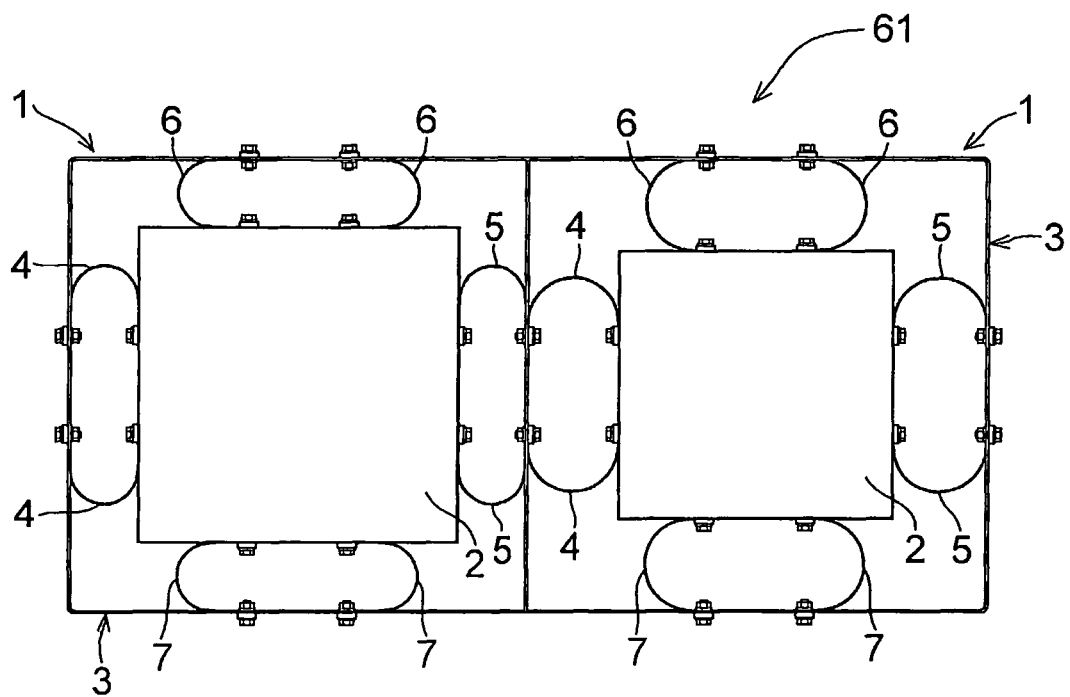
FIG. 6 is a plan view of still another preferred embodiment of the invention.
Figure 7:
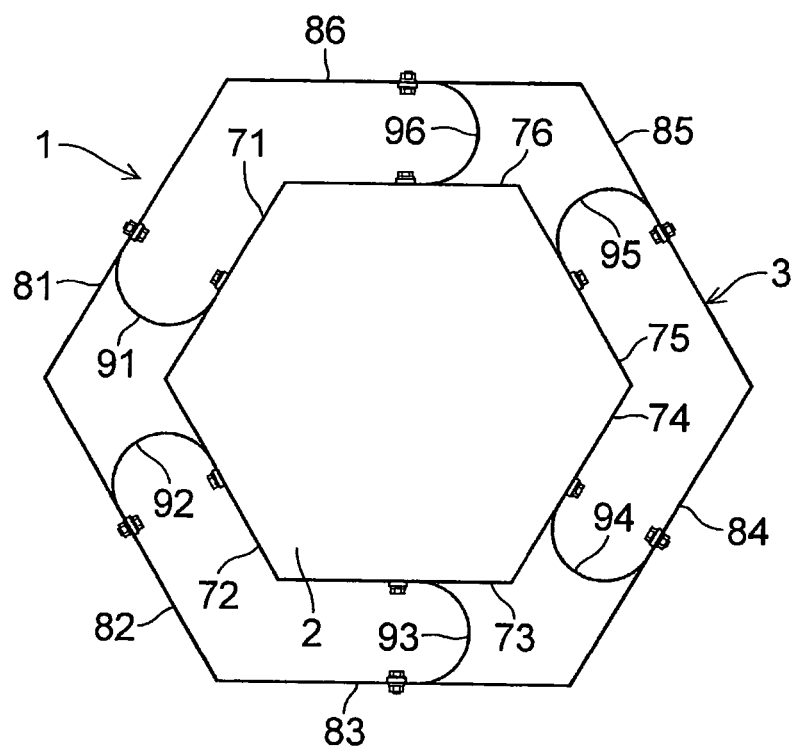
FIG. 7 is a plan view of a further preferred embodiment of the invention.

The damping mechanism 8 in the dynamic vibration absorber 1 in accordance with this embodiment has a mechanism which employs the shear resistance of a viscous body and is adapted to damp the vibration of the weight 2 in the horizontal plane by the shear resistance due to shear deformation occurring in the viscous body 52 between the bottom plate 53 and the resistance plate 54 as the weight 2 is relatively moved in the horizontal plane with respect to the floor portion 45. However, alternatively or in addition to this, the damping mechanism 8 may be provided with a magnetic damping mechanism 101, for example, as shown in FIGS. 4 and 5. The magnetic damping mechanism 101 includes a plurality of magnetic field generating bodies 103 which are fixed to one of the weight 2 and the frame body 3, i.e., the weight 2 in this embodiment, and generate magnetic fields, as well as a plurality of plate-like electric conductors 102 which are fixed to the other one of the weight 2 and the frame body 3, i.e., the frame body 3 in this embodiment, and generate eddy currents by their relative movement in the X direction and the Y direction with respect to the magnetic field generating bodies 103.

The plurality of electric conductors 102 are respectively fixed to inner surfaces of the X-direction vertical wall portions 21 and 22 and the Y-direction vertical wall portions 23 and 24, while each of the plurality of magnetic field generating bodies 103 has a pair of permanent magnets 106 and 107 of different polarities which are each fixed to each of the side surfaces 33, 34, 35 and 36 of the weight 2 by means of a magnetically permeable L-shaped member 105. Each electric conductor 102 and each magnetic field generating body 103 are disposed between the respective pairs of the leaf springs 4, 5, 6 and 7. The respective permanent magnets 106 and 107 for generating magnetic fields are disposed in such a manner as to oppose each other with the electric conductor 102 located therebetween with a gap in the vertical direction V. In order to form a satisfactory magnetic circuit by reducing magnetic resistance between the L-shaped member 1OS supporting the permanent magnet 106 and the L-shaped member 105 supporting the permanent magnet 107, a magnetically permeable member may be interposed between the two L-shaped members 105.

The permanent magnets 106 and 107 are adapted to generate a pair of magnetic poles of mutually different polarities which oppose each other with a gap therebetween so as to generate a magnetic field at a central portion O of the plate-like electric conductor 102 when the weight 2 is stationary.

In such a magnetic damping mechanism 101, when the floor portion 45 of the structure vibrates in the X direction and the Y direction due to an earthquake, a strong wind, and the like, and the weight 2 relatively vibrates in the X direction and the Y direction with respect to the floor portion 45 by being tuned to this vibration, the electric conductors 102 respectively fixed to the X-direction vertical wall portions 21 and 22 and the Y-direction vertical wall portions 23 and 24 relatively move in the X direction and the Y direction with respect to the magnetic field generating bodies 103 to generate electromotive forces in the electric conductors 102. At the same time, consumption of electric power takes place due to the conversion of eddy currents flowing across the electric conductors 102 into thermal energy (eddy current loss) owing to the electromotive forces, and electromagnetic forces for resisting the movement in the X direction and the Y direction are generated on the basis of the eddy currents flowing across the electric conductors 102 and the magnetic fields of the magnetic field generating bodies 103. As a result, the relative movement of the weight 2 in the X direction and the Y direction with respect to the frame body 3 is damped. It should be noted that in the case where a large force is applied to the frame body 3 such as when the dynamic vibration absorber 1 is provided with the magnetic damping mechanism 101, it suffices if the frame body 3 is constructed to be thick to such a degree that the electric conductors 102 and the like can be fixed reliably.

Although an example of the dynamic vibration absorber has been described above, a dynamic vibration absorbing apparatus 61 may be constructed by comprising two dynamic vibration absorbers 1, as shown in FIG. 8. In the dynamic vibration absorbing apparatus 61 shown in FIG. 8, the mass of the weight 2 of one dynamic vibration absorber 1 made different from the mass of the weight 2 of the other dynamic vibration absorber 1, with the result that the natural frequency for the weight 2 of one dynamic vibration absorber 1 is tuned to a primary-mode frequency of the natural frequencies of the structure, while the natural frequency for the weight 2 of the other dynamic vibration absorber 1 is tuned to a secondary-mode frequency of the natural frequencies of the structure. Thus, the natural frequency for the weight 2 of one dynamic vibration absorber 1 is made different from the natural frequency for the weight 2 of the other dynamic vibration absorber 1.

In the dynamic vibration absorbing apparatus 61 shown in FIG. 8, in order to make the natural frequency for the weight 2 of one dynamic vibration absorber 1 different from the natural frequency for the weight 2 of the other dynamic vibration absorber 1, the spring constant which is mainly determined by the leaf springs 4, 5, 6 and 7 of one dynamic vibration absorber 1 may be made different from the spring constant which is mainly determined by the leaf springs 4, 5, 6 and 7 of the other dynamic vibration absorber 1.

In addition, in the case where the dynamic vibration absorbing apparatus 61 is constructed by comprising a plurality of dynamic vibration absorbers 1, as shown in FIG. 8, the damping coefficient which is mainly determined by the damping mechanism 8 of one dynamic vibration absorber 1 may be made different from the damping coefficient which is mainly determined by the damping mechanism 8 of the other dynamic vibration absorber 1, so that the vibration of the structure can be damped optimally effectively.

In the dynamic vibration absorbing apparatus 61, instead of tuning the natural frequency for the weight 2 of one dynamic vibration absorber 1 to the primary-mode frequency of the natural frequencies of the structure and tuning the natural frequency for the weight 2 of the other dynamic vibration absorber 1 to the secondary-mode frequency of the natural frequencies of the structure, the natural frequency for the weight 2 of one dynamic vibration absorber 1 and the natural frequency for the weight 2 of the other dynamic vibration absorber 1 may be made close to each other. This makes it possible to cope with a change in the natural frequency of the structure where the dynamic vibration absorbing apparatus 61 is installed, and it becomes possible to damp the vibration of the structure satisfactorily irrespective of the change in the natural frequency of the structure.

In the above, although the dynamic vibration absorber 1 is constructed by using the weight 2 and the frame body 3 which are square in a plan view, the dynamic vibration absorber 1 may alternatively be constructed by using the weight 2 and the frame body 3 which are regular hexagonal in a plan view, as shown in FIG. 9. As in the case of the dynamic vibration absorber 1 shown in FIG. 9, vertically mounted U-shaped leaf springs 91 to 96 each consisting of one piece may be each interposed between each of side surfaces 71 to 76 of the weight 2 and each of vertical wall portions 81 to 86 of the frame body 3. In addition, instead of the weight 2 and the frame body 3 which are square in a plan view, the dynamic vibration absorber 1 may be constructed by using a weight (not shown) which is substantially circular in a plan view and is constituted by a cylindrical body and a frame body (not shown) which is substantially circular in a plan view and is constituted by a hollow cylindrical body.

The invention claimed is:

1. A dynamic vibration absorber comprising: a weight; a frame body which is fixed to a floor portion of a structure and which surrounds said weight; a plurality of vertically mounted U-shaped leaf springs which are interposed between said frame body and said weight in a direction perpendicular to a vertical direction so as to hold said weight with respect to said frame body movably with respect to all the directions in a plane and substantially immovably in the vertical direction perpendicular to the plane and so as to determine a natural frequency for the weight; and a damping mechanism configured to substantially diminish progressively the vibration of said weight in the plane, said plurality of leaf springs each having a concave surface, wherein said frame body consists of a pair of X-direction vertical wall plates opposed to each other in an X direction in the plane with said weight disposed therebetween and a pair of Y-direction vertical wall plates opposed to each other in a Y direction which is perpendicular to the X direction in the plane with said weight disposed therebetween, said X-direction vertical wall plates and said Y-direction vertical wall plates each extending in vertical direction, wherein at least a first two of said leaf springs are interposed between one of said pair of X-direction vertical wall plates and said weight in the X direction, and are opposed to each other in the Y direction, such that edge portions thereof extending in the vertical direction are secured to said one X-direction vertical wall plate, respectively, other edge portions thereof extending in the vertical direction are secured to said weight, respectively, and said concave surface of one of said at least first two of said leaf springs faces said concave surface of another one of said at least first two of said leaf springs, wherein said pair of X-direction vertical wall plates are united with said pair of Y-direction vertical wall plates, respectively, wherein at least a second two of said leaf springs are interposed between another one of said pair of X-direction vertical wall plates and said weight in the X direction, and are opposed to each other in the Y direction, such that edge portions thereof extending in the vertical direction are secured to said other X-direction vertical wall plate, respectively, other edge portions thereof extending in the vertical direction are secured to said weight, respectively, and said concave surface of one of said at least second two of said leaf springs faces said concave surface of another one of said at least second two of said leaf springs, wherein at least a third two of said leaf springs are interposed between one of said pair of Y-direction vertical wall plates and said weight in the Y direction, and are opposed to each other in the X direction, such that edge portions thereof extending in the vertical direction are secured to said one Y-direction vertical wall plates, respectively, other edge portions thereof extending in the vertical direction are secured to said weight, respectively, and said concave surface of one of said at least third two of said leaf springs faces said concave surface of another one of said at least third two of said leaf springs, wherein at least a fourth two of said leaf springs are interposed between another one of said pair of Y-direction vertical wall plates and said weight in the Y direction, and are opposed to each other in the X direction, such that edge portions thereof extending in the vertical direction are secured to said other Y-direction vertical wall plates, respectively, other edge portions thereof extending in the vertical direction are secured to said weight, respectively, and said concave surface of one of said at least fourth two of said leaf springs faces said concave surface of another one of said at least fourth two of said leaf springs, wherein said weight is held movably with respect to all the directions in the plane and substantially immovably in the vertical direction perpendicular to the plane with respect to the floor portion by means of said pair of X-direction vertical wall plates and said pair of Y-direction vertical wall plates of said frame body and by means of said at least first two, said at least second two, said at least third two and said at least fourth two of said leaf springs, and wherein the damping mechanism consists of;

a first magnetic field generating body which is fixed to one of said weight and said one of said pair of X-direction vertical wall plates, which is disposed in a first surrounded space surrounded and defined by said concave surfaces of said at least first two of said leaf springs, said weight and said one of said pair of X-direction vertical wall plates, and which generates a magnetic field, and a first plate-shaped electric conductor which is fixed to another one of said weight and said one of said pair of X-direction vertical wall plates, which is disposed in said first surrounded space, and which generates an eddy current by its relative movement with respect to said first magnetic field generating body, a second magnetic field generating body which is fixed to one of said weight and said other of said pair of X-direction vertical wall plates, which is disposed in a second surrounded space surrounded and defined by said concave surfaces of said at least second two of said leaf springs, said weight and said other of said pair of X-direction vertical wall plates, and which generates a magnetic field, and a second plate-shaped electric conductor which is fixed to another one of said weight and said other of said pair of X-direction vertical wall plates, which is disposed in said second surrounded space, and which generates an eddy current by its relative movement with respect to said second magnetic field generating body, a third magnetic field generating body which is fixed to one of said weight and said one of said pair of Y-direction vertical wall plates, which is disposed in a third surrounded space surrounded and defined by said concave surfaces of said at least third two of said leaf springs, said weight and said one of said pair of Y-direction vertical wall plates, and which generates a magnetic field, and a third plate-shaped electric conductor which is fixed to another one of said weight and said one of said pair of Y-direction vertical wall plates, which is disposed in said third surrounded space, and which generates an eddy current by its relative movement with respect to said third magnetic field generating body, and a fourth magnetic field generating body which is fixed to one of said weight and said other of said pair of Y-direction vertical wall plates, which is disposed in a fourth surrounded space surrounded and defined by said concave surfaces of said at least fourth two of said leaf springs, said weight and said other of said pair of Y-direction vertical wall plates, and which generates a magnetic field, and a fourth plate-shaped electric conductor which is fixed to another one of said weight and said other of said pair of Y-direction vertical wall plates, which is disposed in said fourth surrounded space, and which generates an eddy current by its relative movement with respect to said fourth magnetic field generating body.

2. The dynamic vibration absorber according to claim 1, wherein each of said first to fourth magnetic field generating bodies has a pair of permanent magnets which generates a pair of magnetic poles of mutually different polarities which oppose each other with a gap therebetween so as to generate a magnetic field at a central portion of said electric conductor.

3. The dynamic vibration absorber according to claim 1, wherein said dynamic vibration absorber is tuned to a natural frequency of a structure where said dynamic vibration absorber is installed.

4. A dynamic vibration absorbing apparatus comprising a plurality of dynamic vibration absorbers according to claim 1, wherein a natural frequency for said weight of at least one of said dynamic vibration absorbers is different from a natural frequency for said weight of another one of said dynamic vibration absorbers.

5. The dynamic vibration absorbing apparatus according to claim 4, wherein the mass of said weight of said at least one of said dynamic vibration absorbers is different from the mass of said weight of said other one of said dynamic vibration absorbers.

6. The dynamic vibration absorbing apparatus according to claim 4, wherein a spring constant of said at least one of said dynamic vibration absorbers is different from a spring constant of said other one of said dynamic vibration absorbers.

7. The dynamic vibration absorbing apparatus according to claim 4, wherein a damping coefficient of said at least one of said dynamic vibration absorbers is different from a damping coefficient of said other one of said dynamic vibration absorbers.

8. A dynamic vibration absorber comprising: a weight; a frame body which is fixed to a floor portion of a structure and which surrounds said weight; a plurality of vertically mounted U-shaped leaf springs which are interposed between said frame body and said weight so as to hold said weight with respect to said frame body movably with respect to all directions in a plane and substantially immovably in a vertical direction perpendicular to the plane and so as to determine a natural frequency for the weight; and a damping mechanism configured to substantially diminish progressively the vibration of said weight in the plane, said plurality of leaf springs each having a concave surface, at least a first two of said leaf springs are interposed between said frame body and said weight in X direction, said concave surface of one of said at least first two of said leaf springs facing said concave surface of another one of said at least first two of said leaf springs, and at least a second two of said leaf springs are interposed between said frame body and said weight in Y direction which is perpendicular to the X direction in the plane, said concave surface of one of said at least second two of said leaf springs facing said concave surface of another one of said at least second two of said leaf springs, the damping mechanism consisting of a first magnetic damping device which is disposed in a first surrounded space surrounded and defined by said concave surfaces of said at least first two of said leaf springs, said weight and said frame body, and a second magnetic damping device which is disposed in a second surrounded space surrounded and defined by said concave surfaces of said at least second two of said leaf springs, said weight and said frame body, said weight being held movably with respect to all the directions in the plane and substantially immovably in the vertical direction perpendicular to the plane with respect to the floor portion by means of said frame body and by means of said plurality of springs.

9. A dynamic vibration absorber comprising: a weight; a frame body which surrounds said weight; a plurality of vertically mounted U-shaped leaf springs which are interposed between said frame body and said weight in a direction perpendicular to a vertical direction so as to hold said weight with respect to said frame body movably with respect to all the directions in a plane and substantially immovably in the vertical direction perpendicular to the plane and so as to determine a natural frequency for the weight; and a damping mechanism configured to substantially diminish progressively the vibration of said weight in the plane, said plurality of leaf springs each having a concave surface, wherein said frame body consists of a pair of X-direction vertical wall plates opposed to each other in an X direction in the plane with said weight disposed therebetween and a pair of Y-direction vertical wall plates opposed to each other in a Y direction which is perpendicular to the X direction in the plane with said weight disposed therebetween, said X-direction vertical wall plates and said Y-direction vertical wall plates each extending in vertical direction, wherein said pair of X-direction vertical wall plates are united with said pair of Y-direction vertical wall plates, respectively, wherein at least a first two of said leaf springs are interposed between one of said pair of X-direction vertical wall plates and said weight in the X direction, and are opposed to each other in the Y direction, such that edge portions thereof extending in the vertical direction are secured to said one X-direction vertical wall plate, respectively, other edge portions thereof extending in the vertical direction are secured to said weight, respectively, and said concave surface of one of said at least first two of said leaf springs faces said concave surface of another one of said at least first two of said leaf springs, wherein at least a second two of said leaf springs are interposed between another one of said pair of X-direction vertical wall plates and said weight in the X direction, and are opposed to each other in the Y direction, such that edge portions thereof extending in the vertical direction are secured to said other X-direction vertical wall plate, respectively, other edge portions thereof extending in the vertical direction are secured to said weight, respectively, and said concave surface of one of said at least second two of said leaf springs faces said concave surface of another one of said at least second two of said leaf springs, wherein at least a third two of said leaf springs are interposed between one of said pair of Y-direction vertical wall plates and said weight in the Y direction, and are opposed to each other in the X direction, such that edge portions thereof extending in the vertical direction are secured to said one Y-direction vertical wall plates, respectively, other edge portions thereof extending in the vertical direction are secured to said weight, respectively, and said concave surface of one of said at least third two of said leaf springs faces said concave surface of another one of said at least third two of said leaf springs, wherein at least a fourth two of said leaf springs are interposed between another one of said pair of Y-direction vertical wall plates and said weight in the Y direction, and are opposed to each other in the X direction, such that edge portions thereof extending in the vertical direction are secured to said other Y-direction vertical wall plates, respectively, other edge portions thereof extending in the vertical direction are secured to said weight, respectively, and said concave surface of one of said at least fourth two of said leaf springs faces said concave surface of another one of said at least fourth two of said leaf springs, wherein said weight is held movably with respect to all the directions in the plane and substantially immovably in the vertical direction perpendicular to the plane with respect to said pair of X-direction vertical wall plates and said pair of Y-direction vertical wall plates of said frame body by means of said at least first two, said at least second two, said at least third two and said at least fourth two of said leaf springs, and wherein the damping mechanism consists of a first magnetic field generating body which is fixed to one of said weight and said one of said pair of X-direction vertical wall plates, which is disposed in a first surrounded space surrounded and defined by said concave surfaces of said at least first two of said leaf springs, said weight and said one of said pair of X-direction vertical wall plates, and which generates a magnetic field, and a first plate-shaped electric conductor which is fixed to another one of said weight and said one of said pair of X-direction vertical wall plates, which is disposed in said first surrounded space, and which generates an eddy current by its relative movement with respect to said first magnetic field generating body, a second magnetic field generating body which is fixed to one of said weight and said other of said pair of X-direction vertical wall plates, which is disposed in a second surrounded space surrounded and defined by said concave surfaces of said at least second two of said leaf springs, said weight and said other of said pair of X-direction vertical wall plates, and which generates a magnetic field, and a second plate-shaped electric conductor which is fixed to another one of said weight and said other of said pair of X-direction vertical wall plates, which is disposed in said second surrounded space, and which generates an eddy current by its relative movement with respect to said second magnetic field generating body, a third magnetic field generating body which is fixed to one of said weight and said one of said pair of Y-direction vertical wall plates, which is disposed in a third surrounded space surrounded and defined by said concave surfaces of said at least third two of said leaf springs, said weight and said one of said pair of Y-direction vertical wall plates, and which generates a magnetic field, and a third plate-shaped electric conductor which is fixed to another one of said weight and said one of said pair of Y-direction vertical wall plates, which is disposed in said third surrounded space, and which generates an eddy current by its relative movement with respect to said third magnetic field generating body, and a fourth magnetic field generating body which is fixed to one of said weight and said other of said pair of Y-direction vertical wall plates, which is disposed in a fourth surrounded space surrounded and defined by said concave surfaces of said at least fourth two of said leaf springs, said weight and said other of said pair of Y-direction vertical wall plates, and which generates a magnetic field, and a fourth plate-shaped electric conductor which is fixed to another one of said weight and said other of said pair of Y-direction vertical wall plates, which is disposed in said fourth surrounded space, and which generates an eddy current by its relative movement with respect to said fourth magnetic field generating body.

10. A dynamic vibration absorber comprising: a weight; a frame body which surrounds said weight; a plurality of vertically mounted U-shaped leaf springs which are interposed between said frame body and said weight so as to hold said weight with respect to said frame body movably with respect to all directions in a plane and substantially immovably in a vertical direction perpendicular to the plane and so as to determine a natural frequency for the weight; and a damping mechanism configured to substantially diminish progressively the vibration of said weight in the plane, said plurality of leaf springs each having a concave surface, at least a first two of said leaf springs are interposed between said frame body and said weight in X direction, said concave surface of one of said at least first two of said leaf springs facing said concave surface of another one of said at least first two of said leaf springs, and at least a second two of said leaf springs are interposed between said frame body and said weight in Y direction which is perpendicular to the X direction in the plane, said concave surface of one of said at least second two of said leaf springs facing said concave surface of another one of said at least second two of said leaf springs, the damping mechanism consisting of a first magnetic damping device which is disposed in a first surrounded space surrounded and defined by said concave surfaces of said at least first two of said leaf springs, said weight and said frame body, and a second magnetic damping device which is disposed in a second surrounded space surrounded and defined by said concave surfaces of said at least second two of said leaf springs, said weight and said frame body, said weight being held movably with respect to all the directions in the plane and substantially immovably in the vertical direction perpendicular to the plane with respect to said frame body by means of said plurality of springs.

* * * * *